United States Patent [19]

Oyama et al.

[11] 4,382,500

[45] May 10, 1983

[54] CONVEYOR SYSTEM FOR CONVEYING PANELS AND SHADOW MASKS

[75] Inventors: Tadao Oyama; Takashi Ohta, both of Mobara, Japan

[73] Assignee: Hitachi, Ltd., Tokyo, Japan

[21] Appl. No.: 272,264

[22] Filed: Jun. 10, 1981

[30] Foreign Application Priority Data

Jun. 11, 1980 [JP] Japan .................................. 55-77764

[51] Int. Cl.[3] .............................................. B65G 47/00

[52] U.S. Cl. ..................................... 198/346; 198/486

[58] Field of Search ............... 198/486, 485, 339, 346; 354/1, 99, 101, 102, 103

[56] References Cited

U.S. PATENT DOCUMENTS 2,022,786 12/1935 Schwab ............................... 198/485

3,209,923 10/1965 Bargel et al. ........................ 198/486

3,522,942 8/1970 Hepp .................................. 198/339

*Primary Examiner*—Joseph E. Valenza

*Assistant Examiner*—Jonathan D. Holmes

*Attorney, Agent, or Firm*—Antonelli, Terry & Wands

[57] ABSTRACT

In a production line for producing color picture tubes, a conveyor system for conveying panels P and masks M between a shadow mask demounting or mounting apparatus 6, 7 and a processing apparatus 2 having downwardly directed panel carrier head 4 and upwardly directed mask table 5. The system 8, 9 includes a mask transfer device 13 and a panel transfer device 30 movably carried by upper rail devices 11, 12, and a panel traverser 41 carried by a lower rail device 40. The convey of the mask is performed solely by the mask transfer device 13, while the panel is conveyed by the panel transfer device 30 and the panel traverser 41.

11 Claims, 7 Drawing Figures

CONVEYOR SYSTEM FOR CONVEYING PANELS AND SHADOW MASKS

BACKGROUND OF THE INVENTION

The present invention relates to a system for conveying panels and shadow masks, for use in the process of manufacturing color picture tubes. More particularly, the invention is concerned with a system for conveying the panels and shadow masks independently between two adjacent processing apparatus such as shadow mask mounting or demounting apparatus and coating apparatus.

In general, the process of manufacturing color picture tubes includes a plurality of coating steps for forming, on the inner surface of the panel, a plurality of films such as a resist film, black matrix films, phosphor films and an emulsion film, and a plurality of exposing steps for exposing the coated panel after an insertion of the shadow mask into the latter.

For conducting these steps automatically, systems have been proposed, as in the specification of the U.S. Pat. No. 4,179,200, in which a plurality of coating apparatus and a plurality of exposing apparatus are arranged in a predetermined order along a panel conveyor line.

In designing and producing such systems, a difficulty arises as to the demounting and mounting of the shadow mask. Namely, it is necessary to demount the shadow mask from the panel for the coating purpose and then to mount the same shadow mask on the panel for the exposure. To cope with this demand, the system shown in the specification of the U.S. Pat. No. 4,179,200 incorporates a three-dimensional conveyor for conveying the shadow mask after the transfer of the panel from the conveyor line to the coating apparatus till the panel is transferred back to the conveyor line.

This system, however, has various problems. Namely, troubles are liable to be caused due to failure in obtaining a perfect synchronism between the operation of the coating apparatus through which the panel is passed and the three-dimensional conveyor by which the shadow mask is conveyed. In addition, for conveying the shadow masks by the three-dimensional conveyor, it is necessary to use specifically designed mask holders.

In order that the shadow mask, which has been temporarily demounted from the panel for the coating of the latter, is mounted again on the same panel without fail, it is considered to be the best solution to arrange such that not only the panels but also the shadow masks are conveyed through the coating stations.

From this point of view, it is suggested to use coating apparatus in which carrier heads carrying the panels and tables mounting the shadow masks are moved along predetermined paths. Such a system, however, cannot be realized successfully unless suitable system is developed for the convey of the panels and shadow masks between the mask demounting apparatus and the coating apparatus and between the coating apparatus and the mask mounting apparatus.

SUMMARY OF THE INVENTION

Accordingly, an object of the invention is to provide a conveyor system for conveying the panels and shadow masks independently between a mask demounting apparatus and processing apparatus such as coating apparatus or between the processing apparatus and a mask mounting apparatus.

Another object of the invention is to provide a conveyor system capable of conveying the panels and shadow masks independently along three-dimensional paths and requiring small installation space.

To these ends, according to an aspect of the invention, there is provided a conveyor system for conveying panels and shadow masks between a processing apparatus of the type having at least a table and a carrier head in pair adapted to be moved along predetermined paths, the table being accessible from the upper side while the carrier head is accessible from the lower side, and a shadow mask demounting or mounting apparatus adjacent to the processing apparatus, the conveyor system comprising: a mask conveyor means for conveying the shadow masks between the table positioned at a first predetermined position and a second predetermined position on the shadow mask demounting or mounting apparatus; a first panel conveyor means for conveying the panels between the carrier head positioned at a third predetermined position and a fourth predetermined position spaced from the third position; and a second panel conveyor means for conveying the panels between the fourth position and a fifth predetermined position on the shadow mask demounting or mounting apparatus.

The above and other objects, as well as advantageous features of the invention will become clear from the following description of the preferred embodiments of the invention taken in conjunction with the accompanying drawings.

DESCRIPTION OF THE PREFERRED EMBODIMENTS

Figure 1:
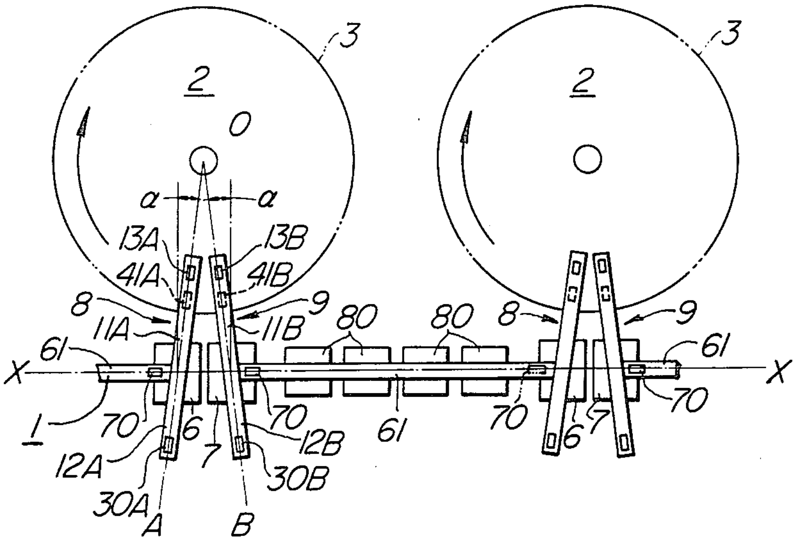
FIG. 1 is a schematic plan view of a part of a coating system for color picture tubes.

Referring first to FIG. 1 schematically showing a part of a panel coating system, a plurality of coating apparatus generally designated at a reference numeral 2 are arranged along a panel conveyor line generally designated at a numeral 1. The coating apparatus 2 has a turret 3 having a plurality of carrier heads 4 arranged at a predetermined constant circumferential pitch and a corresponding number of shadow mask tables 5 to the number of the carrier heads 4 and arranged at a predetermined constant circumferential pitch so that the carrier head 4 and the corresponding table 5 constitute a pair, as will be understood from FIG. 2.

Each carrier head 4 is rotatably supported on the turret 3, and is provided with a panel holding portion *4a* located beneath the turret 3 and a driven disc *4b* located above the same.

The panel holding portion *4a* is adapted to hold a panel P with the inner side of the latter directed downward, so that the attaching and detaching of the panel P is made from the lower side. A carrier head 4 can have a construction similar to that shown in Japanese Patent Laid-open No. 36175/1978.

Each table 5 provided on the upper side of the turret 3 is adapted to receive and hold a shadow mask M. The carrier head 4 and the table 5 constituting a pair are arranged on a radial line passing the axis of rotation of the turret 3.

A shadow mask demounting apparatus 6 for demounting the shadow mask from the panel and a shadow mask mounting apparatus 7 for mounting the shadow mask in the panel are disposed on the conveyor line 1, in the vicinity of the coating apparatus 2. The shadow mask demounting apparatus 6 and the shadow mask mounting apparatus 7 can have known construction. For instance, a shadow mask mounting apparatus as disclosed in Japanese Patent Laid-open No. 115169/1978, capable of performing mounting of the shadow mask into the panel, can be used as the apparatus 7 of the invention.

A conveyor system for conveying the panel and the shadow mask, constructed in accordance with a first embodiment of the invention, is arranged for conveying the panel and the shadow mask from the shadow mask demounting apparatus 6 to the coating apparatus 2. Similarly, for conveying the panel and the shadow mask from the coating apparatus 2 to the shadow mask mounting apparatus 7, arranged is a panel and shadow mask conveyor system 9 constructed in accordance with the first embodiment of the invention. The conveyor systems 8 and 9 can have an identical construction, so that the identical constituents in these apparatus are represented by the same reference numerals in the following description. In FIG. 1, however, the parts of the conveyor system 8 are denoted by numerals having a suffix "A", while the parts of the conveyor system 9 are denoted by numerals having suffix "B", for facilitating the discrimination of the parts of the conveyor systems 8 and 9 from each other.

Figure 2:
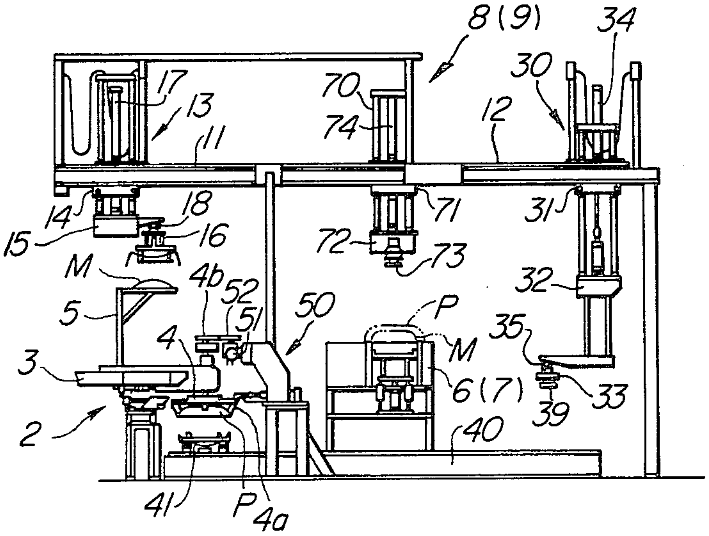
FIG. 2 is a schematic side elevational view of a conveyor system 8 incorporated in the system shown in FIG. 1.

Referring now to FIG. 2, the conveyor system 8 has a mask conveyor rail device 11 extended substantially horizontally between a position above a mask table 5 in the mask receiving position on the coating apparatus and a position above the mask demounting apparatus 6, and a panel conveyor upper rail device 12 extended between a position above the shadow mask demounting apparatus 6 and a position on the extension of the mask conveyor rail device 11.

As will be clearly understood from FIG. 1, these rail devices 11, 12 are disposed on a straight line OA passing the axis O of rotation of the coating apparatus 2. The straight line OA is inclined at a small angle $\alpha$ to the straight line perpendicular to the neutral axis X—X of the conveyor line 1.

On the other hand, the conveyor system 9 has similar rail devices i.e. a mask conveyor rail device 11B and a panel conveyor upper rail device 12B, which are disposed on a straight line OB. The straight line OB also is inclined to the straight line perpendicular to the neutral axis X—X by the same angle $\alpha$ but in the opposite direction to the line OA.

Figure 3:
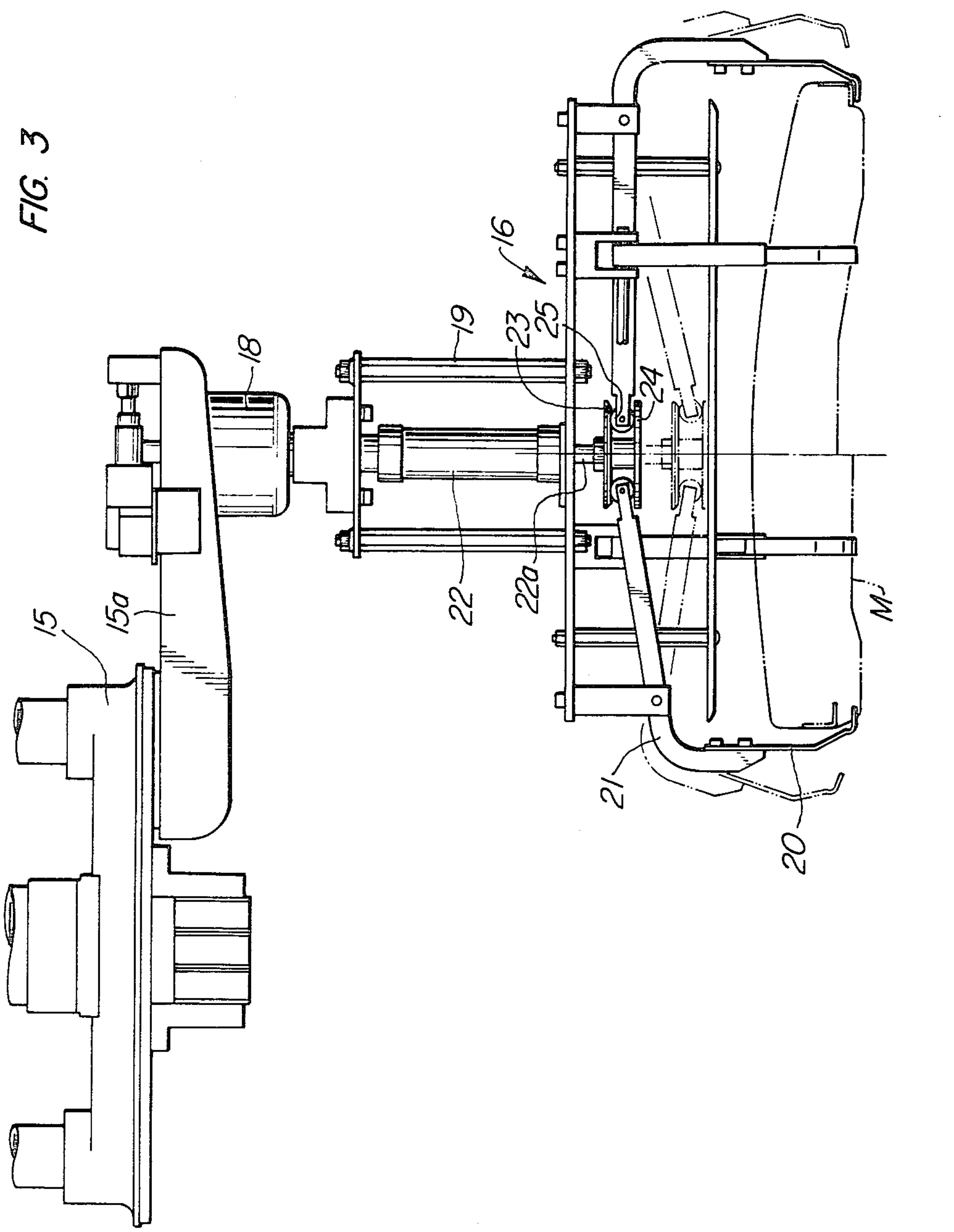
FIG. 3 is an enlarged side elevational view of a mask holder 16 of a mask transfer device 13, in which, for an easier understanding, the side elevations at the right and left sides of the neutral axis of the mask holder 16 are rotated 90° from each other.

Referring again to FIG. 2, a mask transfer device 13 carried by the mask conveyor rail device 11 is adapted to be moved along the latter. The mask transfer device 13 is provided with a first frame 14 having wheels adapted to roll on the rail device 11, a second frame 15 movable up and down relatively to the first frame 14, a mask holder 16 carried by the second frame 15, and a pneumatic cylinder 17 for reciprocatingly driving the second frame 15. As will be seen from FIG. 3, the mask holder 16 is constituted by a pneumatic torque actuator 18 secured to a lever *15a* of the second frame 15, a holder frame 19, levers 21 each provided at its end with a claw 20, and a pneumatic cylinder 22 for actuating the levers 21. A pair of plates 23, 24 are attached to the piston rod *22a* of the cylinder 22. Between these plates 23, 24, disposed is a free roller 25 attached to one end of each lever 21.

Thus, the levers 21 are moved as a result of movement of the piston rod *22a* of the pneumatic cylinder 22, between the position shown in full line in which the claws hold the shadow mask M and the position shown by two-dots-and-dash line in which the claws release the shadow mask M.

The torque actuator 18 is used for rotating the mask holder 16 by an angle $\alpha$ shown in FIG. 1. The mask conveyor rail device 11 is further provided with a suitable means such as an endless chain driven by an electric motor, for driving the mask transfer device 13 between a position shown in FIG. 2, i.e. the position where the mask holder 16 takes a position above the table 5, and a position where the mask holder takes a position above the shadow mask demounting apparatus 6.

The panel conveyor upper rail device 12 movably carries a panel transfer device 30. As in the case of the mask transfer device 13, the panel transfer device 30 is composed of a first frame 31 having wheels rolling on the rail device 12, a second frame 32 movable up and down in relation to the frame 31, a panel holder 33 carried by the second frame 32 and a pneumatic cylinder 34 for reciprocatingly driving the second frame 32.

Figure 4:
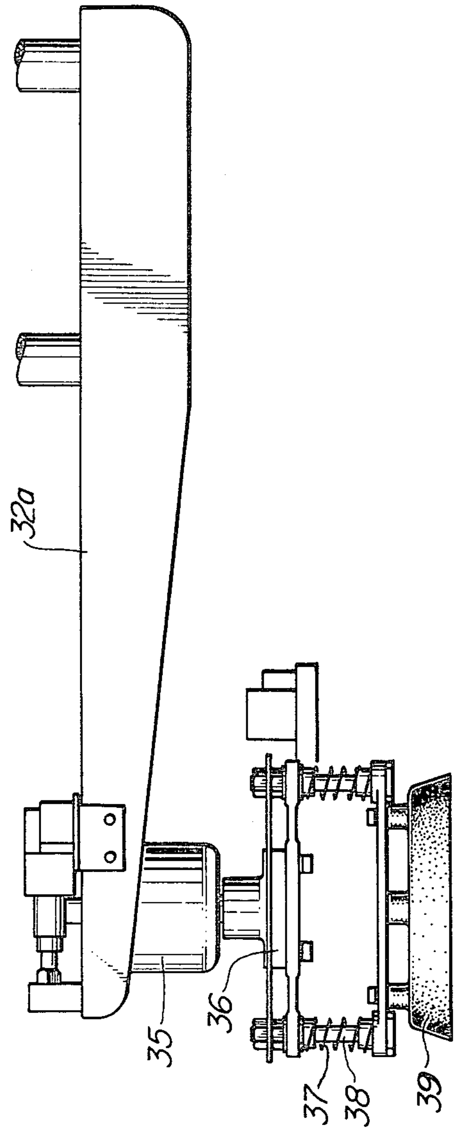
FIG. 4 is an enlarged side elevational view of a panel holder incorporated in the panel transfer device.

As will be understood from FIG. 4, the panel holder 33 is constituted by a torque actuator 35 carried by a lever *32a* of the second frame 32, a holder frame 36 and a vacuum cup 39 which is held by the holder frame 36 through the medium of springs 37 and rods 38 and adapted for holding the panel by the force of the vacuum.

The torque actuator 35 also operates to rotate the vacuum cup 39 by the angle $\alpha$. The panel conveyor upper rail device 12 has means for driving the panel transfer device 30 between the position shown in FIG. 2 and a position where the vacuum cup 39 takes a position above the shadow mask demounting apparatus 6.

The conveyor system further includes a panel conveyor lower rail device 40 disposed beneath the rail devices 11, 12. The rail device 40 extends between the position beneath the carrier head 4 in the panel receiving position of the coating apparatus 2 and a position under the panel transfer device 30 shown by full line in FIG. 2, past the area under the shadow mask demounting apparatus 6.

Figure 5:
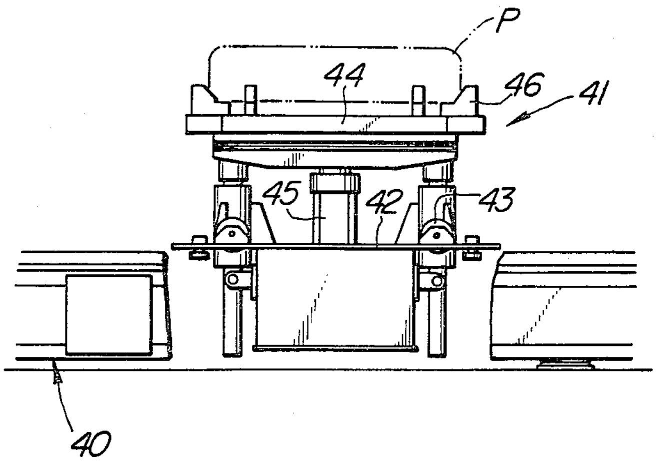
FIG. 5 is a side elevational view of a panel traverser 41.
Figure 6:
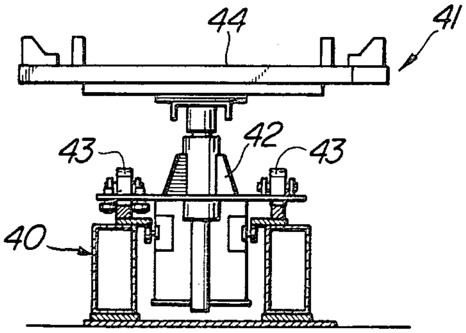
FIG. 6 is a front elevational view of a panel traverser.

The rail device 40 movably carries a panel traverser 41 which is constituted, as shown in FIGS. 5 and 6, by a carrier frame 42 having wheels 43 engaging the rail device 40, a panel support 44 carried vertically movably by the carrier frame 42, and a pneumatic cylinder 45 adapted for driving the panel support 44 up and down.

The panel support 44 is provided at its upper side with a plurality of supporting pieces 46 adapted for supporting the panel P at the lower edge of the latter. Suitable drive means are provided also for driving the panel traverser 41 along the rail device 40.

Referring back to FIG. 2, a positioning device 50 for adjusting the angular position of the carrier head 4 is disposed in the vicinity of the coating apparatus 2. The positioning device 50 includes a motor 51 having a driving disc 52 which can contact the driven disc 4*b* of the carrier head 4.

The positioning device 50 has a function to rotate the carrier head 4 by a suitable angle, when the carrier head 4 is brought to the panel receiving position shown in FIG. 2 as a result of rotation of the turret 3, to locate the carrier head 4 at a predetermined angular position where the principal axis of the plane of the panel P coincides with the straight line O-A shown in FIG. 1.

Referring again to FIG. 1, a plurality of conveyor rails 61 are laid along the axis X—X of the conveyor line 1. These rails 61 are arranged at the same level as the mask conveyor rail device 11 and are provided movably with respective transfers 70. The transfer 70 has, as will be understood from FIG. 2, a carrier frame 71, a holder frame 72 provided at its lower end with a vacuum cup 73 and carried by the carrier frame 71 vertically movably, and a pneumatic cylinder 74. The transfer 70 has a function to transfer the panel incorporating the shadow mask. Beneath the conveyor rails 61, disposed are a plurality of exposure apparatus 80.

The panel coating system heretofore described is provided with a sequence controller (not shown) so that the following operation is performed automatically and sequentially.

In operation, a panel incorporating a shadow mask is transferred by the transfer 70 of the conveyor rail 61 shown at the leftmost part of FIG. 1, and is placed at a predetermined position on the shadow mask demounting apparatus 6. The shadow mask demounting apparatus 6 demounts the shadow mask M downwardly from the panel P. Then, the panel transfer device 30, while holding the panel holder 33 at the elevated position, moves to the position above the shadow mask demounting apparatus 6 and then lowers the panel holder 33 to hold the panel P.

Thereafter, the panel transfer device 30 raises the panel holder 33 slightly and then moves along the rail device 12 to the position shown in FIG. 2. Thereafter, the panel holder 33 is lowered again to deliver the panel to the panel traverser 41 which is stationed at the panel receiving position. During this transferring operation, the torque actuator 35 operates to adjust the angular position of the panel. Thereafter, the panel traverser 41 is moved along the rail device 40 to the position shown at the left side of FIG. 2, and is moved to the position below the carrier head 4. Thereafter, the panel P is raised and delivered to the carrier head 4.

Meanwhile, the shadow mask M which has been demounted by the shadow mask demounting apparatus 6 is caught by the mask holder 16 of the mask transfer device 13 coming down from the upper side, and is then moved upward and transferred to the position above the table 5, while permitting the adjustment of angular position by the torque actuator 18. Subsequently, the mask holder 16 is lowered to deliver the mask M to the table 5.

The turret 3, upon receipt of a set of the panel and the mask, rotates by one pitch to receive a new set of panel and mask which is conveyed in the same procedure as stated heretofore. As the turret 3 rotates, the panels carried by the turret 3 are successively moved through the coating zone so that the desired films are formed to coat the inner surface of the panel.

The mask and the panel as a set, upon arrival at the position beneath the straight line OB of FIG. 1, are conveyed to the shadow mask mounting apparatus 7 by means of the conveyor system 9. This operation is performed in the reverse order to the operation described before for conveying the panel and disc from the demounting apparatus 6 to the coating apparatus 2.

More specifically, the mask M is transferred by the mask transfer device 13 from the table 5 to a predetermined position above the shadow mask mounting apparatus 7. Meanwhile, the panel P is delivered by the carrier head to the traverser 41 and is then sent to the panel transfer position past the area beneath the shadow mask mounting apparatus 7. Thereafter, the panel P is transferred and lowered onto the predetermined position on the shadow mask mounting apparatus 7 by means of the panel transfer device 30.

The shadow mask mounting apparatus 7, upon receipt of the panel and the shadow mask, operates to mount the shadow mask in the right place within the panel. The panel now incorporating the shadow mask is absorbed and held by the transfer 70 and is conveyed along the rails 61. During this convey, the panel is exposed by means of exposure apparatus 80. The thus exposed panel is then delivered to another shadow mask demounting apparatus 6 shown at the right side of FIG. 1, and is delivered to the coating apparatus 2 of the right side in the same procedure as that stated before.

Thus, in the conveyor system 8, 9 of the described embodiment, the lines of convey of the panels and shadow masks are arranged in a three-dimensional and rational way to include a mask transfer device 13 for transferring the shadow masks to the coating apparatus 2 and movable in the area above the shadow mask demounting apparatus 6 or the shadow mask mounting apparatus 7, a panel traverser 41 for transferring the panel P to the coating apparatus 2 and movable in the area beneath the shadow mask demounting apparatus 6 or the shadow mask mounting apparatus 7, and a panel transfer device 30 for transferring the panel between the panel traverser and the shadow mask demounting apparatus 6 or the shadow mask mounting apparatus 7 and movable in the area above the shadow mask demounting apparatus 6 or the shadow mask mounting apparatus 7.

This three-dimensional rational arrangement permits a reduction of the installation space. In addition, since the path of convey of the panels does not intersect the path of convey of the shadow masks, the flows of the panels and shadow masks are remarkably simplified to facilitate the automation of the conveyor system.

Figure 7:
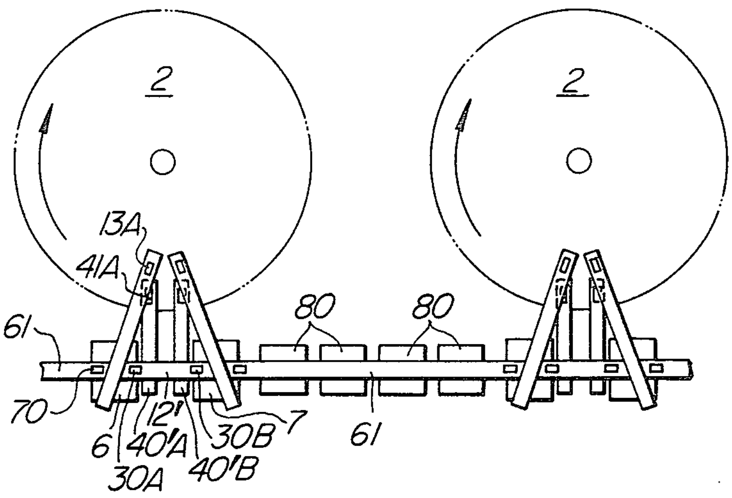
FIG. 7 is a plan view of a panel coating system incorporating a conveyor system in accordance with another embodiment of the invention.

FIG. 7 is a schematic plan view of a conveyor system constructed in accordance with another embodiment of the invention.

In the first embodiment explained in conjunction with FIGS. 1 to 6, the panel conveyor upper rail device 12 is disposed on the extension of the mask conveyor rail device 11, while the panel conveyor lower rail device 40 is disposed just under the mask conveyor rail device 11 and the panel conveyor upper rail device 12. In the second embodiment shown in FIG. 7, however, the panel conveyor lower rail device 40' is arranged at one lateral side of the shadow mask demounting device or mounting device 6, 7, while the panel conveyor upper rail device 12′ is disposed to extend between a position above the delivery section of the panel conveyor lower rail device 40′ and a position above the shadow mask demounting apparatus or mounting apparatus 6, 7. It will be understood by those skilled in the art that this arrangement offers the same advantage as that performed by the first embodiment.

In the embodiments described heretofore, two independent conveyor systems 8, 9 are used for the delivery of the panels P and shadow masks M from the shadow mask demounting apparatus 6 to the coating apparatus 2 and for the delivery of the panels P and the shadow masks M from the coating apparatus 2 to the shadow mask mounting apparatus 7. This arrangement, however, is not essential nor critical. Namely, in the case where the demounting and mounting of the shadow mask is performed by a single apparatus capable of performing both of the demounting and the mounting, it is possible to use a single conveyor system of the invention for the convey of the panels and the shadow masks to the demounting/mounting apparatus from the coating apparatus and vice versa.

It is also to be noted that the invention can apply to other use than the convey of the panels and shadow masks to and from the coating apparatus, such as delivery of the panels and shadow masks to and from washing apparatus or other processing apparatus.

Also, the coating apparatus can have a linear holder for holding carrier heads carrying the panels along a straight path through a linear coating zone, insteadly of the rotary turret-type holder used in the described embodiments.

While a preferred embodiments of the invention have been described using specific terms, such description is for illustrative purpose only, and it is to be understood that changes and variations may be made without departing from the spirit or scope of the following claims.

What is claimed is:

1. A conveyor system for conveying panels and shadow masks between a processing apparatus of the type having at least a table and a carrier head arranged in pair adapted to be moved along a predetermined path, said table being accessible from the upper side while said carrier head is accessible from the lower side, and a shadow mask demounting or mounting apparatus disposed adjacent to said processing apparatus, said conveyor system comprising:

a mask conveyor means for conveying a shadow mask between the table positioned at a first predetermined position and a second predetermined position on said shadow mask mounting or demounting apparatus;

a first panel conveyor means for conveying said panel between said carrier head positioned at a third predetermined position and a fourth predetermined position spaced from said third predetermined position;

and a second panel conveyor means for conveying said panel between said fourth predetermined position and a fifth predetermined position on said shadow mask demounting or mounting apparatus.

2. A conveyor system as claimed in claim 1, wherein said mask conveyor means includes a mask conveyor rail device extending substantially above said first predetermined position and said second predetermined position, and a mask transfer device movably carried by said mask conveyor rail device, said mask transfer device having a mask holder movable up and down.

3. A conveyor system as claimed in claim 1 or 2, wherein said first panel conveyor means includes a panel conveyor lower rail device extending substantially beneath said third predetermined position and said second predetermined position, and a panel traverser movably carried by said panel conveyor lower rail device, said panel traverser having a panel holder movable up and down.

4. A conveyor system as claimed in claim 2, wherein said first panel conveyor means includes a panel conveyor lower rail device extending substantially beneath said third predetermined position and said fourth predetermined position, and a panel traverser movably carried by said panel conveyor lower rail device, said panel traverser having a panel holder movable up and down, and wherein said second panel conveyor means includes a panel conveyor upper rail device extending substantially above said fourth predetermined position and said fifth predetermined position, and a panel transfer device movably carried by said panel conveyor upper rail device, said panel transfer device having a panel holder movable up and down.

5. A conveyor system as claimed in claim 4, wherein said mask conveyor rail device and said panel conveyor upper rail device are arranged along a line, while said panel conveyor lower rail device is disposed substantially beneath said mask conveyor rail device and said mask conveyor upper rail device.

6. A conveyor system as claimed in claim 5, wherein said panel conveyor lower rail device extends through the area beneath said shadow mask demounting or mounting apparatus.

7. A conveyor system as claimed in claim 4, wherein said panel conveyor lower rail device extends at a lateral side of said shadow mask demounting or mounting apparatus.

8. A conveyor system as claimed in claim 7, wherein said panel conveyor upper rail device extends substantially at a right angle to said mask conveyor device.

9. A conveyor system as claimed in any one of claims 1, 2, 4, 5, 6, 7 and 8, wherein said mask demounting or mounting apparatus is adapted to perform only the demounting of said shadow mask from said panel, while said mask conveyor means is adapted to perform only the convey of said mask from said shadow mask demounting or mounting apparatus to said table of said processing apparatus, whereas said first and second panel conveyor means in cooperation perform only the convey of said panel from said mask demounting or mounting apparatus to said carrier head of said processing apparatus.

10. A conveyor system as claimed in any one of claims 1, 2, 4, 5, 6, 7 and 8, wherein said mask conveyor means is adapted to perform only the convey of said shadow masks from said table to said mask demounting or mounting apparatus, while said first and second panel conveyor means in cooperation perform only the convey of said panels from said carrier head to said shadow mask demounting or mounting apparatus, whereas said mask demounting or mounting apparatus is adapted to perform only the mounting of said shadow mask in said panel.

11. A conveyor system as claimed in any one of claims 2, 4, 5, 6, 7 and 8, characterized by further comprising transfer means including rails extending substantially at the same level as said mask conveyor rail means substantially at a right angle to the latter, a transfer movably carried by said rails, and a panel holder carried vertically movably by said transfer, said transfer means being adapted to transfer said panel with said shadow mask mounted therein to and from said mask demounting or mounting apparatus.

* * * * *